(12) United States Patent
Ballard

(10) Patent No.: US 8,876,437 B2
(45) Date of Patent: Nov. 4, 2014

(54) USE OF ELASTOMERS TO PRODUCE GELS FOR TREATING A WELLBORE

(75) Inventor: David Antony Ballard, Aberdeenshire (GB)

(73) Assignee: M-I L.L.C., Houston, TX (US)

( * ) Notice: Subject to any disclaimer, the term of this patent is extended or adjusted under 35 U.S.C. 154(b) by 255 days.

(21) Appl. No.: 12/597,631

(22) PCT Filed: Apr. 23, 2008

(86) PCT No.: PCT/US2008/061272
§ 371 (c)(1),
(2), (4) Date: Nov. 23, 2009

(87) PCT Pub. No.: WO2008/134359
PCT Pub. Date: Nov. 6, 2008

(65) Prior Publication Data
US 2010/0087566 A1 Apr. 8, 2010

Related U.S. Application Data

(60) Provisional application No. 60/914,604, filed on Apr. 27, 2007, provisional application No. 60/942,346, filed on Jun. 6, 2007.

(51) Int. Cl.
| | | |
|---|---|---|
| C09K 17/00 | (2006.01) | |
| E02D 3/12 | (2006.01) | |
| E21B 43/16 | (2006.01) | |
| C09K 8/60 | (2006.01) | |
| C09K 8/524 | (2006.01) | |
| C09K 8/54 | (2006.01) | |
| C09K 8/00 | (2006.01) | |
| C09K 3/22 | (2006.01) | |
| C09K 8/52 | (2006.01) | |
| C09K 17/30 | (2006.01) | |
| C09K 8/508 | (2006.01) | |
| C09K 8/035 | (2006.01) | |
| C09K 8/588 | (2006.01) | |

(52) U.S. Cl.
CPC ............. C09K 8/5086 (2013.01); C09K 3/22 (2013.01); C09K 8/52 (2013.01); C09K 17/30 (2013.01); C09K 8/035 (2013.01); C09K 8/588 (2013.01)
USPC ........ 405/264; 166/305.1; 507/219; 507/239; 507/268; 523/130

(58) Field of Classification Search
CPC .......... C09K 3/22; C09K 8/035; C09K 17/30; C09K 8/52; C09K 8/588; C09K 8/5086
USPC ...................................................... 523/130
See application file for complete search history.

(56) References Cited

U.S. PATENT DOCUMENTS

| | | | | |
|---|---|---|---|---|
| 3,014,530 A | * | 12/1961 | Harvey et al. | 166/293 |
| 3,308,884 A | * | 3/1967 | Robichaux | 166/295 |
| 3,851,479 A | | 12/1974 | Argabright et al. | |
| 4,042,031 A | | 8/1977 | Knapp | |
| 4,114,382 A | | 9/1978 | Kubens et al. | |
| 4,148,772 A | | 4/1979 | Marchetti et al. | |
| 4,307,980 A | * | 12/1981 | Meyer et al. | 405/264 |
| 4,365,670 A | * | 12/1982 | McLaughlin | 166/295 |
| 4,374,968 A | | 2/1983 | McLaughlin | |
| 4,383,054 A | * | 5/1983 | Schulze et al. | 523/131 |
| 4,410,667 A | | 10/1983 | Porter, Jr. et al. | |
| 4,637,956 A | | 1/1987 | Das et al. | |
| 4,760,882 A | | 8/1988 | Novak | |
| 4,767,829 A | | 8/1988 | Kordomenos et al. | |
| 4,767,836 A | * | 8/1988 | Cuscurida | 528/45 |
| 4,870,141 A | | 9/1989 | Kordomenos | |
| 4,976,833 A | | 12/1990 | Debroy et al. | |
| 4,984,635 A | | 1/1991 | Cullick et al. | |
| 5,048,608 A | | 9/1991 | Wiser-Halladay et al. | |
| 5,108,458 A | | 4/1992 | Marumoto et al. | |
| 5,199,491 A | | 4/1993 | Kutta et al. | |
| 5,256,729 A | | 10/1993 | Kutta et al. | |
| 5,453,536 A | | 9/1995 | Dai et al. | |
| 5,559,064 A | | 9/1996 | Tsuchinari et al. | |
| 5,945,387 A | | 8/1999 | Chatterji et al. | |
| 5,986,033 A | | 11/1999 | Hughes et al. | |
| 6,060,445 A | | 5/2000 | Chandraker et al. | |
| 6,165,947 A | | 12/2000 | Chang et al. | |
| 6,288,176 B1 | | 9/2001 | Hsieh et al. | |
| 6,431,280 B2 | * | 8/2002 | Bayliss et al. | 166/263 |

(Continued)

FOREIGN PATENT DOCUMENTS

| | | |
|---|---|---|
| CA | 2654443 A1 | 12/2007 |
| CA | 2684978 A1 | 11/2008 |

(Continued)

OTHER PUBLICATIONS

European Search Report issued in Application No. 08746679.3 dated Nov. 4, 2010 (7 pages).
Office Action issued in corresponding Eurasian Application No. 200971007(OFE/0911/0205) dated Apr. 21, 2011 (4 pages).
Office Action issued in the corresponding Eurasian Application No. 200971006 dated Apr. 21, 2011 (4 pages).
Office Action issued in related Canadian Application No. 2,684,978 dated Jul. 18, 2011 (3 pages).
Examiner's First Report issued in Australian Application No. 2008245781 dated Sep. 24, 2010 (2 pages).
Examiner's First Report issued in Australian Applicaiton No. 2008245793 dated Sep. 24, 2010 (4 pages).
European Search Report issued in European Application No. 08746654.6 dated Oct. 6, 2010 (6 pages).

(Continued)

Primary Examiner — Peter F Godenschwager
Assistant Examiner — David Karst
(74) Attorney, Agent, or Firm — Osha Liang LLP

(57) ABSTRACT

A method of treating an earth formation that includes introducing at least one blocked isocyanate in a liquid phase into the earthen formation; introducing at least one active hydrogen compound into the earthen formation; and contacting the blocked isocyante and the active hydrogen compound form an elastomeric gel is disclosed.

11 Claims, No Drawings

(56) References Cited

U.S. PATENT DOCUMENTS

| | | |
|---|---|---|
| 6,830,105 B2 | 12/2004 | Thesing |
| 7,008,908 B2 | 3/2006 | Chan et al. |
| 7,157,527 B2 | 1/2007 | Kuntimaddi et al. |
| 7,183,354 B2 | 2/2007 | Halladay et al. |
| 2002/0028932 A1 | 3/2002 | Loontjens et al. |
| 2003/0004282 A1 | 1/2003 | Kamikado et al. |
| 2003/0194635 A1 | 10/2003 | Mulligan |
| 2004/0067318 A1* | 4/2004 | Jones et al. .......... 427/402 |
| 2004/0236021 A1 | 11/2004 | Faecke et al. |
| 2005/0028979 A1 | 2/2005 | Brannon et al. |
| 2005/0187314 A1 | 8/2005 | Anderson et al. |
| 2006/0011343 A1 | 1/2006 | Burts, III |
| 2006/0030492 A1 | 2/2006 | Ventresca et al. |
| 2006/0122357 A1 | 6/2006 | Faecke et al. |
| 2006/0148391 A1 | 7/2006 | Ono et al. |
| 2006/0281854 A1 | 12/2006 | Imamura et al. |
| 2007/0009750 A1 | 1/2007 | Ito et al. |
| 2007/0017676 A1 | 1/2007 | Reddy et al. |
| 2007/0023288 A1 | 2/2007 | Kuwano et al. |
| 2007/0029087 A1 | 2/2007 | Nguyen et al. |
| 2007/0287767 A1 | 12/2007 | Ballard |
| 2008/0017376 A1 | 1/2008 | Badalamenti et al. |
| 2010/0120944 A1 | 5/2010 | Ballard |

FOREIGN PATENT DOCUMENTS

| | | |
|---|---|---|
| EP | 980957 A1 | 2/2000 |
| EP | 1060325 A1 | 12/2000 |
| EP | 1348832 A1 | 10/2003 |
| GB | 2427630 A | 1/2007 |
| WO | 99/43923 A1 | 9/1999 |
| WO | 2007/146865 A1 | 12/2007 |

OTHER PUBLICATIONS

International Search Report from PCT/US2008/061272 dated Sep. 30, 2008 (3 pages).
Written Opinion from PCT/US2008/061272 dated Sep. 30, 2008 (4 pages).
Office Action issued in the corresponding European Application No. 08746679.3 dated Sep. 30, 2011 (4 pages).
Office Action issued in the related European Application No. 08746654.6 dated Sep. 26, 2011 (7 pages).
International Search Report from PCT/US2008/061300 dated Oct. 17, 2008 (2 pages).
Written Opinion from PCT/US2008/061300 dated Oct. 17, 2008 (4 pages).
Office Action issued in corresponding Australian Application No. 2008245781 dated May 27, 2011 (2 pages).
Office Action issued in related U.S. Appl. No. 12/597,542 dated Mar. 1, 2012 (46 pages).
Office Action issued in related Australian Application No. 2008245793 dated Mar. 1, 2012 (2 pages).
Office Action issued in related Australian Application No. 2008245793 dated Dec. 7, 2011 (2 pages).
Office Action issued in corresponding Australian Application No. 2008245781 dated Feb. 1, 2012 (2 pages).
Office Action for Eurasian Application No. 200971007 dated Oct. 22, 2012, with English translation thereof (2 pages).
Office Action for Eurasian Application No. 200971006/28 dated Oct. 31, 2012, with English translation thereof (2 pages).
Correspondence reporting Decision of Grant issued by the Eurasian patent office on Oct. 30, 2013 in corresponding Eurasian application No. 200971007 (2 pages).
Office Action in corresponding Eurasian application No. 200971006 dated Apr. 16, 2013 (3 pages).
Correspondence reporting an Office Action in corresponding Argentine Patent Application No. AR 066336 (3 pages), dated Jan. 29, 2013.
Office Action issued in corresponding Eurasian Application No. 200971007 dated Feb. 1, 2012 (4 pages).
Office Action issued in corresponding Australian Application No. 2008245781 dated Jun. 6, 2012 (2 pages).
Office Action issued in counterpart European Patent Application No. 08746654.6 dated Jan. 31, 2014 (7 pages).

* cited by examiner

USE OF ELASTOMERS TO PRODUCE GELS FOR TREATING A WELLBORE

CROSS-REFERENCE TO RELATED APPLICATIONS

This application claims priority to U.S. Patent Application Nos. 60/914,604, filed on Apr. 27, 2007, and 60/942,346, filed in Jun. 6, 2007, both of which are herein incorporated by reference in their entirety.

BACKGROUND OF INVENTION

1. Field of the Invention

Embodiments disclosed herein relate generally to elastomer compositions used in downhole applications.

2. Background Art

Lost circulation is a recurring drilling problem, characterized by loss of drilling mud into downhole formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

During the drilling process muds are circulated downhole to remove rock as well as deliver agents to combat the variety of issues described above. Mud compositions may be water or oil-based (including mineral oil, biological, diesel, or synthetic oils) and may comprise weighting agents, surfactants, proppants, and gels. In attempting to cure these and other problems, crosslinkable or absorbing polymers, loss control material (LCM) pills, and cement squeezes have been employed. Gels, in particular, have found utility in preventing mud loss, stabilizing and strengthening the wellbore, and zone isolation and water shutoff treatments.

In attempting to cure these and other problems, crosslinkable or absorbing polymers, loss control material (LCM) pills, and cement squeezes have been employed, each of which may include materials such as lignins and lignosulfonates, as well as lignin and lignosulfonate gels.

In many wells, water-based and oil-based muds are both used. Water-based muds are generally used early in the drilling process. Later, oil-based muds are substituted as the well gets deeper and reaches the limit of the water-based muds due to limitations such as lubricity and well bore stabilization. The majority of gels employ water compatible gelling and crosslinking agents, as exemplified by U.S. Patent Application Publication No. 20060011343 and U.S. Pat. Nos. 7,008,908 and 6,165,947, which are useful when using water-based muds. There is, however, a dearth of methods using non-aqueous gels which are compatible with oil-based muds.

Thus, there is a continuing need for the development gels for downhole applications that are relatively environmentally safe, and that may formed to be compatible with oil-based muds.

SUMMARY OF INVENTION

In one aspect, embodiments disclosed herein relate to a method of treating an earth formation that includes introducing at least one blocked isocyanate in a liquid phase into the earthen formation; introducing at least one active hydrogen compound into the earthen formation; and contacting the blocked isocyante and the active hydrogen compound form an elastomeric gel.

In another aspect, embodiments disclosed herein relate to a method of treating an earth formation that includes introducing at least one blocked isocyanate in a liquid phase into the earthen formation; introducing at least one amine into the earthen formation; and contacting the blocked isocyante and the amine form an elastomeric gel.

In yet another aspect, embodiments disclosed herein relate to a method of treating an earth formation that includes introducing at least one blocked isocyanate having at least di-isocyanate functionality into the earth formation; introducing at least one active hydrogen compound into the earthen formation; introducing at least one trimerization catalyst into the earth formation, and contacting the blocked isocyante, the active hydrogen compound, and the trimerization catalyst to form a gel.

Other aspects and advantages of the invention will be apparent from the following description and the appended claims.

DETAILED DESCRIPTION

Embodiments disclosed herein relate to the use of elastomeric gels in downhole applications. Other embodiments of the disclosure relate to methods for producing elastomeric gels. In the following description, numerous details are set forth to provide an understanding of the present disclosure. However, it will be understood by those skilled in the art that the present invention may be practiced without these details and that numerous variations or modifications from the described embodiments may be possible.

In one aspect, embodiments disclosed herein relate to a process for treating a earth formation. The process may include: introducing a blocked isocyante and an active hydrogen compound into the earthen formation; and allowing the reactants component to form an elastomeric gel downhole. Additionally, the reactants may be optionally contacted with a catalyst to form a gel. In other aspects, embodiments disclosed herein relate to methods of making such gels, and applications in which the gels disclosed herein may be useful.

Elastomeric Gels

A gel is a colloidal system in which an extended porous network of interconnected molecules spans the volume of a liquid medium. Although gels appear to be solid, jelly-like materials, by weight, gels are mostly liquid. The elastomeric gels of the present disclosure may be used in downhole applications as a component of drilling mud and may be preformed and pumped downhole. Alternatively, reactants or components may be introduced simultaneously or sequentially downhole forming the gel in situ. For example, the liquid components may be pumped into a wellbore which traverses a loosely consolidated formation, and allowed to cure, thereby forming a polymeric network which stabilizes the formation and the wellbore as a whole. Depending on the particular application, one of ordinary skill in the art would appreciate that the gel precursors may be selected such that the gels may be non-aqueous, aqueous formed from an aqueous emulsion.

Elastomers are amorphous polymers existing above their glass transition temperature, so that considerable segmental motion is possible. At ambient temperatures, they are thus relatively soft and deformable. Such properties are derived from the structure of the compositions, long polymer chains crosslinked during curing. The elasticity is derived from the ability of the long chains to reconfigure themselves to distribute an applied stress, while the covalent cross-linkages ensure that the elastomer will return to its original configuration when the stress is removed.

There are numerous types of elastomer compositions. Among the various compositions, several types of elastomers may be formed by the reaction of an isocyanate group with a compound having an active hydrogen thereon. As known in the art, the term active hydrogen compound refers to a compound that will give up or transfer a hydrogen atom to another substance. The reaction between an isocyanate and an active hydrogen compound proceeds by the an active hydrogen atom-containing nucleophilic center attacking the electrophilic carbon atom of an isocyanate, and the active hydrogen atom being added to the nitrogen atom of the isocyanate as shown below in Eq. 1:

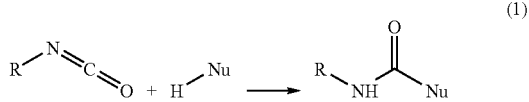

(1)

Among the types of elastomers which are reaction products of isocyanates includes polyurethanes and polyureas.

Polyurethanes are typically produced by the polyaddition reaction of a polyisocyanate with a polyalcohol (polyol). A polyisocyanate is a molecule containing two or more isocyanate functional groups, $R\!-\!(N\!\!=\!\!C\!\!=\!\!O)_{n\geq 2}$, and a polyol is a molecule having two or more hydroxyl functional groups, $R'\!-\!(OH)_{n\geq 2}$. The reaction product is a polymer containing the urethane linkage, —RNHCOOR'—, formed by the reaction between an isocyanate group and a hydroxyl group.

Polyureas are produced by the polyaddition reaction of a polyisocyanate with a polyamine. As stated above, a polyisocyanate is a molecule containing two or more isocyanate functional groups, $R\!-\!(N\!\!=\!\!C\!\!=\!\!O)_{n\geq 2}$, while a polyamine is a molecule having two or more amine functional groups, $R'\!-\!(NH_2)_{n\geq 2}$. The reaction product is a polymer containing the urea linkage, —RNHCNHR'—, formed by the reaction between an isocyanate group with an amine group.

Thus, in some embodiments, the gels are formed from isocyantes which may react with active hydrogen compounds to form an elastomeric, gelatinous structure. Additionally, in some embodiments, the formed gels may be a variety of elastomer compositions having a gelatinous structure formed downhole. Further, catalysts, accelerators, and/or retardants may optionally be added to effect or enhance gel formation. Also, additives such as stabilizers, plasticizers, adhesion promoters, and fillers may be added to enhance or tailor the gel properties.

Isocyanates

Isocyanates useful in embodiments disclosed herein may include isocyanates, polyisocyanates, and isocyanate prepolymers. Suitable polyisocyanates include any of the known aliphatic, alicyclic, cycloaliphatic, araliphatic, and aromatic di- and/or polyisocyanates. Inclusive of these isocyanates are variants such as uretdiones, biurets, allophanates, isocyanurates, carbodiimides, and carbamates, among others.

Aliphatic polyisocyanates may include hexamethylene diisocyanate, trimethylhexamethylene diisocyanate, dimeric acid diisocyanate, lysine diisocyanate and the like, and biuret-type adducts and isocyanurate ring adducts of these polyisocyanates. Alicyclic diisocyanates may include isophorone diisocyanate, 4,4'-methylenebis(cyclohexylisocyanate), methylcyclohexane-2,4- or -2,6-diisocyanate, 1,3- or 1,4-di (isocyanatomethyl)cyclohexane, 1,4-cyclohexane diisocyanate, 1,3-cyclopentane diisocyanate, 1,2-cyclohexane diisocyanate, and the like, and biuret-type adducts and isocyanurate ring adducts of these polyisocyanate. Aromatic diisocyanate compounds may include xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluydine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl)-sulfone, isopropylidenebis(4-phenylisocyanate), and the like, and biuret type adducts and isocyanurate ring adducts of these polyisocyanates. Polyisocyanates having three or more isocyanate groups per molecule may include, for example, triphenylmethane-4,4',4"-triisocyanate, 1,3,5-triisocyanato-benzene, 2,4,6-triisocyanatotoluene, 4,4'-dimethyldiphenylmethane-2,2',5,5'-tetraisocyanate, and the like, biuret type adducts and isocyanurate ring adducts of these polyisocyanates. Additionally, isocyanate compounds used herein may include urethanation adducts formed by reacting hydroxyl groups of polyols such as ethylene glycol, propylene glycol, 1,4-butylene glycol, dimethylolpropionic acid, polyalkylene glycol, trimethylolpropane, hexanetriol, and the like with the polyisocyanate compounds, and biuret type adducts and isocyanurate ring adducts of these polyisocyanates.

Other isocyanate compounds may include tetramethylene diisocyanate, toluene diisocyanate, hydrogenated diphenylmethane diisocyanate, hydrogenated xylylene diisocyanate, and trimers of these isocyanate compounds; terminal isocyanate group-containing compounds obtained by reacting the above isocyanate compound in an excess amount and a low molecular weight active hydrogen compounds (e.g., ethylene glycol, propylene glycol, trimethylolpropane, glycerol, sorbitol, ethylenediamine, monoethanolamine, diethanolamine, triethanolamine etc.) or high molecular weight active hydrogen compounds such as polyesterpolyols, polyetherpolyols, polyamides and the like may be used in embodiments disclosed herein.

Other useful polyisocyanates include, but are not limited to 1,2-ethylenediisocyanate, 2,2,4- and 2,4,4-trimethyl-1,6- hexamethylenediisocyanate, 1,12-dodecandiisocyanate, omega, omega-diisocyanatodipropylether, cyclobutan-1,3-diisocyanate, cyclohexan-1,3- and 1,4-diisocyanate, 2,4- and 2,6-diisocyanato-1-methylcylcohexane, 3-isocyanatomethyl-3,5,5-trimethylcyclohexylisocyanate ("isophoronediisocyanate"), 2,5- and 3,5-bis-(isocyanatomethyl)-8-methyl-1,4-methano, decahydronaphthathalin, 1,5-, 2,5-, 1,6- and 2,6-bis-(isocyanatomethyl)-4,7-methanohexahydroindan, 1,5-, 2,5-, 1,6- and 2,6-bis-(isocyanato)-4,7-methanohexahydroindan, dicyclohexyl-2,4'- and -4,4'-diisocyanate, omega, omega-diisocyanato-1,4-diethylbenzene, 1,3- and 1,4-phenylenediisocyanate, 4,4'-diisocyanatodiphenyl, 4,4'-diisocyanato-3,3'-dichlorodiphenyl, 4,4'-diisocyanato-3,3'methoxy-diphenyl, 4,4'-diisocyanato-3,3'-diphenyl-diphenyl, naphthalene-1,5-diisocyanate, N—N'-(4,4'-dimethyl-3,3'-diisocyanatodiphenyl)-uretdion, 2,4,4'-triisocyanatano-diphenylether, 4,4',4"-triisocyanatotriphenylmethant, and tris(4-isocyanatophenyl)-thiophosphate.

Other suitable polyisocyanates may include: 1,8-octamethylenediisocyanate; 1,11-undecane-methylenediisocyanate; 1,12-dodecamethylendiisocyanate; 1-isocyanato-3-isocyanatomethyl-3,5,5-trimethylcyclohexane; 1-isocyanato-1-methyl-4(3)-isocyanatomethylcyclohexane; 1-isocyanato-2-isocyanatomethylcyclopentane; (4,4'- and/or 2,4'-) diisocyanato-dicyclohexylmethane; bis-(4-isocyanato-3-methylcyclohexyl)-methane; a,a,a',a'-tetramethyl-1,3- and/or -1,4-xylylenediisocyanate; 1,3- and/or 1,4-hexahydroxylylene-diisocyanate; 2,4- and/or 2,6-hexahydrotoluene-diisocyanate; 2,4- and/or 2,6-toluene-diisocyanate; 4,4'- and/or 2,4'-diphenylmethane-diisocyanate; n-isopropenyl-dimethylbenzyl-isocyanate; any double bond containing isocyanate; and any of their derivatives having urethane-, isocyanurate-, allophanate-, biuret-, uretdione-, and/or iminooxadiazindione groups.

Polyisocyanates may also include aliphatic compounds such as trimethylene, pentamethylene, 1,2-propylene, 1,2-butylene, 2,3-butylene, 1,3-butylene, ethylidene and butylidene diisocyanates, and substituted aromatic compounds such as dianisidine diisocyanate, 4,4'-diphenylether diisocyanate and chlorodiphenylene diisocyanate.

Other isocyanate compounds are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is hereby incorporated by reference. Isocyanates formed from polycarbamates are described in, for example, U.S. Pat. No. 5,453,536, hereby incorporated by reference herein. Carbonate isocyanates are described in, for example, U.S. Pat. No. 4,746,754, hereby incorporated by reference herein.

However, in order to prevent premature reaction with the active hydrogen compound, and thus gellation, or reaction with any water that may likely be present in the wellbore, the isocyanate pumped downhole for formation of an elastomeric gel may be a blocked isocyanate. Many isocyanate reactions are reversible, and this phenomenon allows obtaining blocked isocyanates, which regenerate the isocyanate function through heating. A generic reaction scheme for the isocyanate blocking, unblocking, and ultimate reaction with an active hydrogen compound is shown below in Eq. 2:

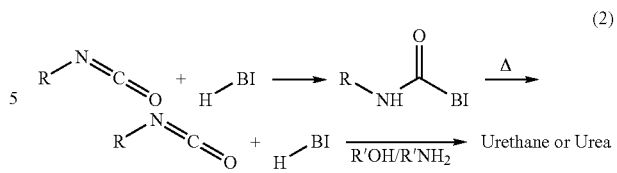

Blocked isocyanates are typically manufactured starting from acidic hydrogen-containing compounds such as phenol, ethyl acetoacetate and ε-caprolactam. Typical unblock temperatures range between 90 to 200° C., depending on the isocyanate structure and blocking agent. For example, aromatic isocyanates are typically unblocked at lower temperatures than those required to unblock aliphatic isocyanates. The dissociation temperature decreases according to the following order of blocking agents: alcohols>lactams>phenols>oximes>pyrazoles>active methylene groups compounds. Products such as methylethylcetoxime (MEKO), diethyl malonate (DEM) and 3,5-dimethylpyrazole (DMP) are typical blocking agents used, for example, by Baxenden Chemicals Limited (Accrington, England). DMP's unblock temperature is between 110-120° C., melting point is 106° C. and boiling point is high, 218° C., without film surface volatilization problems. Trixene prepolymers may include 3,5-dimethylpyrazole (DMP) blocked isocyanates, which may be commercially available from Baxenden Chemicals Limited.

Suitable isocyanate blocking agents may include alcohols, ethers, phenols, malonate esters, methylenes, acetoacetate esters, lactams, oximes, and ureas, among others. Other blocking agents for isocyanate groups include compounds such as bisulphites, and phenols, alcohols, lactams, oximes and active methylene compounds, each containing a sulfone group. Also, mercaptans, triazoles, pyrrazoles, secondary amines, and also malonic esters and acetylacetic acid esters may be used as a blocking agent. The blocking agent may include glycolic acid esters, acid amides, aromatic amines, imides, active methylene compounds, ureas, diaryl compounds, imidazoles, carbamic acid esters, or sulfites.

For example, phenolic blocking agent may include phenol, cresol, xylenol, chlorophenol, ethylphenol and the like. Lactam blocking agent may include gamma-pyrrolidone, laurinlactam, epsilon-caprolactam, delta-valerolactam, gamma-butyrolactam, beta-propiolactam and the like. Methylene blocking agent may include acetoacetic ester, ethyl acetoacetate, acetyl acetone and the like. Oxime blocking agents may include formamidoxime, acetaldoxime, acetoxime, methylethylketoxime, diacetylmonoxime, cyclohexanoxime and the like; mercaptan blocking agent such as butyl mercaptan, hexyl mercaptan, t-butyl mercaptan, thiophenol, methylthiophenol, ethylthiophenol and the like. Acid amide blocking agents may include acetic acid amide, benzamide and the like. Imide blocking agents may include succinimide, maleimide and the like. Amine blocking agents may include xylidine, aniline, butylamine, dibutylamine diisopropyl amine and benzyl-tert-butyl amine and the like. Imidazole blocking agents may include imidazole, 2-ethylimidazole and the like. Imine blocking agents may include ethyleneimine, propyleneimine and the like. Triazoles blocking agents may include compounds such as 1,2,4-triazole, 1,2,3-benzotriazole, 1,2, 3-tolyl triazole and 4,5-diphenyl-1,2,3-triazole.

Alcohol blocking agents may include methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate, ethyl lactate and the like. Additionally, any suitable aliphatic, cycloaliphatic or aromatic alkyl monoalcohol may be used as a blocking agent in accordance with the present disclosure. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be used. Suitable cycloaliphatic alcohols include, for example, cyclopentanol, cyclohexanol and the like, while aromatic-alkyl alcohols include phenylcarbinol, methylphenylcarbinol, and the like.

Examples of suitable dicarbonylmethane blocking agents include: malonic acid esters such as diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; and acetylacetates such as methyl acetoacetate, ethyl acetoacetate, propyl acetoacetate, butyl acetoacetate and alkoxyalkylacetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl) malonate.

Malonic or alkylmalonic acid esters derived from linear aliphatic, cycloaliphatic, and/or arylalkyl aliphatic alcohols may also be used. Such esters may be made by alcoholysis using any of the above-mentioned alcohols or any monoalcohol with any of the commercially available esters (e.g., diethylmalonate). For example, diethyl malonate may be reacted with 2-ethylhexanol to obtain the his-(2-ethylhexyl)-malonate. It is also possible to use mixtures of alcohols to obtain the corresponding mixed malonic or alkylmalonic acid esters. Suitable alkylmalonic acid esters include: butyl malonic acid diethylester, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloromalonate.

Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is incorporated herein by reference. Further, one of ordinary skill in the art would appreciate that mixtures of the above-listed isocyanate blocking agents may also be used.

In some embodiments, blocked polyisocyanate compounds may include, for example, polyisocyanates having at least two free isocyanate groups per molecule, where the isocyanate groups are blocked with an above-described isocyanate blocking agent.

Blocked isocyanates may be prepared by reaction of one of the above-mentioned isocyanate compounds and a blocking agent by a conventionally known appropriate method.

In other embodiments, the blocked isocyanates used in embodiments disclosed herein may be any isocyanate where the isocyanate groups have been reacted with an isocyanate blocking compound so that the resultant capped isocyanate is stable to active hydrogens at room temperature but reactive with active hydrogens at elevated temperatures, such as between about 65° C. to 200° C. U.S. Pat. No. 4,148,772, for example, describes the reaction between polyisocyanates and capping agent, fully or partially capped isocyanates, and the reaction with or without the use of a catalyst, and is incorporated herein by reference.

Formed blocked polyisocyanate compounds are typically stable at room temperature. When heated, for example, to 70° C. or above in some embodiments, or to 120° C., 130° C., 140° C. or above in other embodiments, the blocking agent is dissociated to regenerate the free isocyanate groups, which may readily react with hydroxyl groups.

As an alternative to an external or conventional blocking agent, the isocyanates of the present disclosure may be internally blocked. The term internally blocked, as used herein, indicates that there are uretdione groups present which unblock at certain temperatures to free the isocyanate groups for cross-linking purposes. Isocyanate dimers (also referred to as uretdiones) may be obtained by dimerizing diisocyanates in the presence of phosphine catalysts. The dimerization is reversible such that under mild heat, monomeric isocyanates are obtained as shown in Eq. 3:

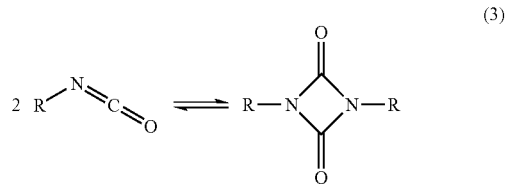

(3)

Active Hydrogen Compounds

As described above, active hydrogen compounds such as polyols and polyamines may be reacted with an isocyanate, such as those disclosed herein, to form a polyurethane gel and polyurea gel, respectively.

Aliphatic polyols useful in preparing polyurethane gels may have a molecular weight of 62 up to 2000 and include, for example, monomeric and polymeric polyols having two or more hydroxyl groups. Examples of the monomeric polyols include ethylene glycol, propylene glycol, butylene glycol, hexamethylene glycol, cyclohexamethylenediol 1,1,1-trimethylolpropane, pentaerythritol, and the like. Examples of polymeric polyols include the polyoxyalkylene polyols (i.e., the diols, triols, and tetrols), the polyester diols, triols, and tetrols of organic dicarboxylic acids and polyhydric alcohols, and the polylactone diols, triols, and tetrols having a molecular weight of 106 to about 2000. Other examples of suitable polyols include: glycerine monoalkanoates (e.g., glycerine monostearates); dimer fatty alcohols; diethylene glycol; triethylene glycol; tetraethylene glycol; 1,4-dimethylolcyclohexane; dodecanediol; bisphenol-A; hydrogenated bisphenol A; 1,3-hexanediol; 1,3-octanediol; 1,3-decanediol; 3-methyl-1,5-pentanediol; 3,3-dimethyl-1,2-butanediol; 2-methyl-1,3-pentanediol; 2-methyl-2,4-pentanediol; 3-hydroxymethyl-4-heptanol; 2-hydroxymethyl-2,3-dimethyl-1-pentanol; glycerine; trimethylol ethane; trimethylol propane; trimerized fatty alcohols; isomeric hexanetriols; sorbitol; pentaerythritol; di- and/or tri-methylolpropane; di-pentaerythritol; diglycerine; 2,3-butenediol; trimethylol propane monoallylether; fumaric and/or maleinic acid containing polyesters; 4,8-bis-(hydroxymethyl)-tricyclo[5,2,0(2,6)]-decane long chain alcohols. Suitable hydroxy-functional esters may be prepared by the addition of the above-mentioned polyols with epsilon-caprolactone or reacted in a condensation reaction with an aromatic or aliphatic diacid. These polyols may be reacted with any of the isocyanates described above.

Aliphatic polyamines useful in preparing polyureas may have a molecular weight of 60 to 2000 and include monomeric and polymeric primary and secondary aliphatic amines having at least two amino groups. Examples include alkylene diamines such as ethylene diamine; 1,2-diaminopropane; 1,3-diaminopropane; 2,5-diamino-2,5-dimethylhexane; 1,11-diaminoundecane; 1,12-di amino dodecane; piperazine, as well as other aliphatic polyamines such as polyethylenimines (PEI), which are ethylenediamine polymers and are commercially available under the trade name Lupasol® from BASF (Germany). PEIs may vary in degree of branching and therefore may vary in degree of crosslinking. LUPASOL® PEIs may be small molecular weight constructs such as LUPASOL® FG with an average molecular weight of 800 or large molecular weight constructs such as LUPASOL® SK with average molecular weight of 2,000,000. Cycloaliphatic diamines suitable for use may include those such as isophoronediamine; ethylenediamine; 1,2-propylenediamine; 1,3-propylenediamine; N-methyl-propylene-1,3-diamine; 1,6-hexamethylenediamine; 1,4-diaminocyclohexane; 1,3-diaminocyclohexane; N,N-dimethylethylenediamine; and 4,4'-dicyclohexyl-methanediamine for example, in addition to aromatic diamines, such as 2,4-diaminotoluene; 2,6-diaminotoluene; 3,5-diethyl-2,4-diaminotoluene; and 3,5-diethyl-2,6-diaminotoluene for example; and primary, mono-, di-, tri- or tetraalkyl-substituted 4,4'-diamino-diphenylmethanes. Additionally, while many diamines are listed above, one of ordinary skill in the art would appreciate that tri- and tetraamines may also be used in other embodiments of the present disclosure.

In yet another embodiment the aliphatic amine may be a polyetheramine such as those commercially available under the trade name JEFFAMINE® Huntsman Performance Products (Woodlands, Tex.). For example, useful JEFFAMINE® products may include triamines JEFFAMINE® T-5000 and JEFFAMINE® T-3000 or diamines such as JEFFAMINE® D-400 and JEFFAMINE® D-2000. Useful polyetheramines may possess a repeating polyether backbone and may vary in molecular weight from about 200 to about 5000 g/mol. In addition, hydrazino compounds such as adipic dihydrazide or ethylene dihydrazine may be used, as may also, alkanolamines such as ethanolamine, diethanolamine, and tris(hydroxyethy)ethylenediamine.

Further, one of ordinary skill in the art would appreciate that, in various embodiments, it may be desirable to possess additional control over the curing reaction to produce the elastomeric gel. Such control may be obtained, for example, by using less chemically reactive amine structures, such as secondary amines, amines immobilized in a molecular sieve, or other less reactive or "slower amines" that may be known in the art. Suitable secondary amines may include those supplied by Huntsman Performance Products (Woodlands, Tex.), under the JEFFAMINE® SD product family, such as JEFFAMINE® SD-401 and JEFFAMINE® SD-2001.

Additionally, it is also within the scope of the present disclosure that one or more epoxy resins may be present in the mixture of isocyanate and active hydrogen compound. Inclusion of an epoxy resin may allow for the formation of a polyurethane or polyurea/epoxide hybrid gel. Conventionally, due to the higher reactivity of isocyanates, as compared to epoxides, isocyanates will react with active hydrogen compounds as described above prior to reaction of epoxides with available active hydrogen compounds (which may include non-reacted active hydrogens included in the mixture or active hydrogens that have been generated in the isocyanate-polyol/polyamine reaction).

The epoxy resin component may be any type of epoxy resin useful in molding compositions, including any material containing one or more reactive oxirane groups, referred to herein as "epoxy groups" or "epoxy functionality." Epoxy resins useful in embodiments disclosed herein may include monofunctional epoxy resins, multi- or poly-functional epoxy resins, and combinations thereof. Monomeric and polymeric epoxy resins may be aliphatic, cycloaliphatic, aromatic, or heterocyclic epoxy resins. The polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example). The epoxies may be pure compounds, but are generally mixtures or compounds containing one, two or more epoxy groups per molecule. For example, such epoxy compounds may also include compounds such as ethylene glycol diglycidyl ether, propylene glycol diglycidyl ether, butylene glycol diglycidyl ether, sorbitol polyglycidyl ether, epoxy functionalized polyalkalene glycols, trimethylolpropane triglycidyl ether, diglycidyl ether of neopentyl glycol, epoxidized 1,6-hexanediol, 1,4-butanediol diglycidyl ether (BDDGE), 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether, or combinations thereof. In other embodiments, the epoxy compounds may include epoxidized natural oils such as those discussed in U.S. Patent Publication No. 2007/0287767, which is assigned to the present assignee and herein incorporated by reference in its entirety. In some embodiments, epoxy resins may also include reactive —OH groups, which may react at higher temperatures with anhydrides, organic acids, amino resins, phenolic resins, or with epoxy groups (when catalyzed) to result in additional crosslinking.

Polyisocyanurates

The present disclosure also relates to the use and/or formation of polyisocyanurates. As discussed above with respect to dimers of isocyanates, isocyanates may also form a trimer having isocyanurate functionality as shown in Eq. 4:

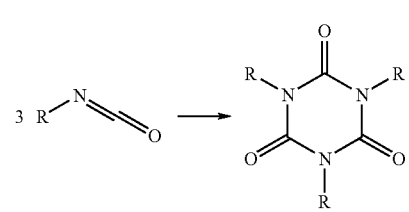

Eq. 4

However, if diisocynates (at least di-functionality) are used in polytrimerization, a three-dimensional crosslinked polymer having isocyanurate rings results. Such isocyanates may include isocyanate of those discussed above, including for example, hexamethylene diisocyanate and toluene diisocyanate. Thus, it is within the scope of the present disclosure when injecting diisocyanates (or other multi-functional isocyantes) into a formation, polytrimerization may be allowed to occur from reaction between the isocyanates, in addition to reaction of the isocyanates with active hydrogen compounds.

However, it is also within the scope of the present disclosure that one or more isocyanates used in reaction with an active hydrogen compound may include one or more isocyanurate rings therein. One example of an isocyanate having isocyanurate rings therein is VESTAGON® B1530 available from Evonik Industries AG (Esson, Germany). Further, one skilled in the art would also appreciate that any of the blocking agents described above may be used with di- or multi-isocyanates that trimerize downhole or with polyisocyanates having isocyanurate functionality therein.

One skilled in the art would appreciate that the strength of bonds may vary among ureas, urethanes, and isocyanurates, where isocyanurates are considered to have greater strength/rigidity and thermal stability. Thus, in accordance with the present disclosure, isocyanurates rings may be formed (or used) when greater rigidity or thermal stability is desired. Control of resulting properties may be based on varying the ratios of the species injected downhole. For example, when a combination of urea and isocyanurate bonds are desired, the relative amounts of each may be based on the amount of amine injected and/or amount of isocyanurate rings contained within an isocyanate being injected downhole.

Catalysts

In some embodiments, the elastomeric gel may be aided in its formation with the use of a catalyst. Suitable catalysts may include organometallic catalysts such as organic complexes of Sn, Ti, Pt, Pb, Sb, Zn, or Rh, inorganic oxides such as manganese (IV) oxide, calcium peroxide, or lead dioxide, and combinations thereof, metal oxide salts such as sodium perborates and other borate compounds, or organic hydroperoxides such as cumene hydroperoxide. In a particular embodiment, the organometallic catalyst may be dibutyltin dilaurate, a titanate/zinc acetate material, tin octoate, a carboxylic salt of Pb, Zn, Zr, or Sb, and combinations thereof.

Further, in forming polyisocyanurates, suitable catalysts may include Lewis based, such as tertiary amines, phosphines, metal or quaternary ammonium salts of alkoxides or Lewis acid such as various organic metal compounds such as metal carboxylates.

The catalyst may be present in an amount effective to catalyze the curing of the liquid elastomer composition. In various embodiments, the catalyst may be used in an amount ranging from about 0.01 to about 10 weight percent, based on the total weight of the liquid elastomer(s), from about 0.05 to about 5 weight percent in other embodiments, and from about 0.10 to about 2 weight percent in yet other embodiments.

Additives

Additives are widely used in elastomer compositions to tailor the physical properties of the resultant polymeric gel. In some embodiments, additives may include plasticizers, thermal and light stabilizers, flame-retardants, fillers, adhesion promoters, or rheological additives. Accelerators and retardants may optionally be used to control the cure time of the elastomer. For example, an accelerator may be used to shorten the cure time while a retardant may be used to prolong the cure time. In some embodiments, the accelerator may include an amine, a sulfonamide, or a disulfide, and the retardant may include a stearate, an organic carbamate and salts thereof, a lactone, or a stearic acid.

Addition of plasticizers may reduce the modulus of the polymer at the use temperature by lowering its Tg. This may allow control of the viscosity and mechanical properties of the elastomeric gel. In some embodiments, the plasticizer may include phthalates, epoxides, aliphatic diesters, phosphates, sulfonamides, glycols, polyethers, trimellitates or chlorinated paraffin. In some embodiments, the plasticizer may be a diisooctyl phthalate, epoxidized soybean oil, di-2-ethylhexyl adipate, tricresyl phosphate, or trioctyl trimellitate.

Fillers are usually inert materials which may reinforce the elastomeric gel or serve as an extender. Fillers therefore affect gel processing, storage, and curing. Fillers may also affect the properties of the gel such as electrical and heat insulting properties, modulus, tensile or tear strength, abrasion resistance and fatigue strength. In some embodiments, the fillers may include carbonates, metal oxides, clays, silicas, mica, metal sulfates, metal chromates, or carbon black. In some embodiments, the filler may include titanium dioxide, calcium carbonate, non-acidic clays, or fumed silica.

Addition of adhesion promoters may improve adhesion to various substrates. In some embodiments, adhesion promoters may include epoxy resins, modified phenolic resins, modified hydrocarbon resins, polysiloxanes, silanes, or primers. For example, Addition of rheological additives may control the flow behavior of the compound. In some embodiments, rheological additives may include fine particle size fillers, organic agents, or combinations of both. In some embodiments, rheological additives may include precipitated calcium carbonates, non-acidic clays, fumed silicas, or modified castor oils.

Further, the incorporation of silanes may be also desirable. In some embodiments, silanes such as organosilanes and amino silanes may assist in the formation of the elastomeric gels in several ways, including, reaction with any unblocked isocyanates (either those that were originally unblocked or those that have become unblocked), which may slow reaction with an active hydrogen compound, increase bond strength and/or improve adhesion promotion.

Gel Preparation

In one embodiment, the gel is formed by mixing the elastomer with the catalyst and additives in an appropriate solvent. Solvents that may be appropriate for non-aqueous gels may comprise oil-based muds for use in downhole applications and may include mineral oil, biological oil, diesel oil, and synthetic oils. Alternatively, aqueous or water-miscible fluid may be used in aqueous gels or gels formed from an aqueous emulsion.

Depending on the particular application, it may be desirable to form an elastomeric gel downhole to consolidate or otherwise treat loose or permeable formations. Polyurea and polyurethane are particularly well suited for downhole applications because they are pumpable in their precursor states, and may form a gel in situ. In various embodiments, the elastomer precursors may be used in their neat form, may be dissolved in a solvent, or may be dispersed or emulsified in a non-miscible phase, to form an elastomeric gel downhole with an optional additive.

For example, such elastomer precursors (isocyanates and polyol or polyamine) may be simultaneously or sequentially pumped downhole to traverse a loosely consolidated formation in the wellbore. A catalyst or other desired additives may optionally be pumped downhole to further cure the elastomer compositions to form a strongly bonded matrix that may efficiently coat the loosely consolidated formation. The inventors of the present disclosure have discovered that such a strongly bonded matrix may effectively retain the loosely consolidated formation, therefore controlling the production of sand grains from the treated zones. This treatment may serve to strengthen the wellbore and reduce debris which may cause wear to downhole tools. Alternatively, it may also be envisioned that the gel is preformed, and introduced into the wellbore.

In further embodiments, the elastomer composition may be branched or dendritic. In yet other embodiments, combinations of any of the above listed materials to be cured may be used.

Aging Temperature

In various embodiments, the cure mechanism may be temperature dependent.

Thus, some elastomers may preferentially cure at elevated temperatures such as about 60 to 100° C., while yet others may cure at higher temperatures such as 100-200° C. However, one of ordinary skill in the art would appreciate that, in various embodiments, the reaction temperature may determine the amount of time required for gel formation.

Time Required for Gel Formation

Embodiments of the gels disclosed herein may be formed by mixing an isocyanate with an active hydrogen compound, and optionally with a catalyst. In some embodiments, a gel may form immediately upon mixing isocyanate and active hydrogen compound. In other embodiments, a gel may form within 1 minute of mixing; within 5 minutes of mixing in other embodiments; within 30 minutes of mixing in other embodiments. In some embodiments, a gel may form within 1 hour of mixing; within 8 hours in other embodiments; within 16 hours in other embodiments; within 80 hours in other embodiments; within 120 hours in yet other embodiments.

Gel Viscosity

In some embodiments, a solution of elastomer precursors may initially have a viscosity similar to that of solvent, e.g., water. A water-like viscosity may allow the solution to effectively penetrate voids, small pores, and crevices, such as encountered in fine sands, coarse silts, and other formations. In other embodiments, the viscosity may be varied to obtain a desired degree of flow sufficient for decreasing the flow of water through or increasing the load-bearing capacity of a formation. The viscosity of the solution may be varied by increasing or decreasing the amount of solvent relative to the elastomer precursors, by employing viscosifying agents, or by other techniques common in the art.

In some embodiments, the combined amount of elastomer precursors may range from 0.5 to 100 weight percent, based upon the total weight of solvent in the solution. In other embodiments, the combined amount of elastomer precursors may range from 5 to 100 weight percent, based upon the total weight of solvent in the solution; from 20 to 70 weight percent in other embodiments; from 25 to 65 weight percent in yet other embodiments. As used herein, total weight of solvent is exclusive of any additional water added with pH adjusting reagents.

Gel Hardness

The reaction of the isocyanate and active hydrogen compound may produce gels having a consistency ranging from a viscous sludge to a hard gel. In some embodiments, the reaction of the isocyanate and active hydrogen compound may result in a soft elastic gel. In other embodiments, the reaction may result in a firm gel and in a hard gel in yet other embodiments. The hardness of the gel is the force necessary to break the gel structure, which may be quantified by measuring the force required for a needle to penetrate the crosslinked structure. Hardness is a measure of the ability of the gel to resist to an established degree the penetration of a weighted test needle.

Hardness may be measured by using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 4 mm diameter, cylindrical, flat faced probe into the gel sample at a constant speed of 30 mm per minute. When the probe is in contact with the gel, a force is applied to the probe due to the resistance of the gel structure until it fails, which is recorded via the load cell and computer software. As the probe travels through the sample, the force on the probe and the depth of penetration are measured. The force on the probe may be recorded at various depths of penetration, such as 20, 25, and 30 mm, providing an indication of the gel's overall hardness.

In some embodiments, the resulting gel may have a hardness value from 10 to 100000 gram-force. In other embodiments, the resulting gel may be a soft elastic gel having a hardness value in the range from 10 to 100 gram-force. In other embodiments, the resulting gel may be a firm gel having a hardness value from 100 to 500 gram-force. In other embodiments, the resulting gel may range from hard to tough, having a hardness value from 500 to 100000 gram-force; from 1500 to 75000 gram-force in other embodiments; from 2500 to 50000 gram-force in yet other embodiments; from 5000 to 30000 gram-force in yet other embodiments.

In other embodiments, the hardness of the gel may vary with the depth of penetration. For example, the gel may have a hardness of 1500 gram-force or greater at a penetration depth of 20 mm in some embodiments. In other embodiments, the gel may have a hardness of 5000 gram-force or greater at a penetration depth of 20 mm; 15,000 gram-force or greater at a penetration depth of 20 mm in other embodiments; and 25000 gram-force or greater at a penetration depth of 25 mm in yet other embodiments.

With respect to the variables listed above (i.e. temperature, time, etc.), those having ordinary skill in light of the disclosure will appreciate that, by using the present disclosure as a guide, properties may be tailored as desired.

Elastomer Processing

Some embodiments of the elastomeric gels disclosed herein may be formed in a single component system, where the isocyanate and active hydrogen compound, and optionally catalysts, additives, accelerators or retarders are pre-mixed and may be placed or injected prior to cure. The gel times may be adjusted by the use of retarders or accelerators, or by the selection of a more or less reactive active hydrogen compound. Other embodiments of the gels disclosed herein may also be formed in a two-component system, where the components may be mixed separately and combined immediately prior to injection. Alternatively, one reagent, the isocyanate or active hydrogen compound, may be placed in the wellbore or the near-wellbore region where it may then be contacted by the other reagent, either the isocyanate or active hydrogen compound as required.

EXAMPLES

Example 1

Baxenden Trixene BI 7770, a blocked isocyanate and either Huntsman JEFFAMINE® T3000 or Huntsman JEFFAMINE® T5000, polyetheramines, were mixed in various proportions. The hardness of the resultant gels was measured after 16 hours at 70° C., a temperature lower than typical for curing of a blocked isocyanate with an active hydrogen compound. The hardness of the resultant gels was then measured after the samples had cooled. The initial hardness is the peak force on the probe just before the gel fails or tears. The bulk low and high values are the lowest and highest values after the initial peak as the probe travels through the bulk of the sample. Gels that are so elastic that the gel does not tear or fail before the end of the test (when the probe has almost reached the bottom of the test vial), renders a "no failure" (NF) reading. The formulations and hardness results are shown below in Tables 1(a) and 1(b).

TABLE 1(a)

| Sample # | 1 | 2 | 3 | 4 | 5 | 6 | 7 | 8 | 9 | 10 | 11 |
|---|---|---|---|---|---|---|---|---|---|---|---|
| | Volume (mL) | | | | | | | | | | |
| TRIXENE ® BI 7770 | 10 | 5 | 5 | 5 | 5 | 5 | 5 | 5 | 5 | 5 | 5 |
| Jeff T3000 | 2.5 | 2.5 | 2.5 | 2.5 | 2.5 | 0 | 0 | 0 | 0 | 5 | 5 |
| Jeff T5000 | 0 | 0 | 0 | 0 | 0 | 5 | 5 | 5 | 5 | 0 | 0 |
| Base oil | 0 | 2.5 | 5 | 7.5 | 10 | 2.5 | 5 | 7.5 | 10 | 2.5 | 5 |
| Gel time/min | 40 | 25 | 25 | 25-45 | 25-45 | 30-45 | 45-80 | 45-80 | 45-80 | 30-60 | 30-60 |
| | Hardness at 16 hours (g Force) | | | | | | | | | | |
| Initial | 4486 | OS | OS | 4383 | 1260 | OS | OS | OS | OS | OS | 3675 |
| Bulk Low | NF | — | — | — | — | — | — | — | — | — | NF |
| Bulk High | NF | — | — | — | — | — | — | — | — | — | — |
| Distance to max (mm) | — | 8.6 | 10.3 | — | — | 12.2 | 14.6 | 16.6 | 20.8 | 21 | — | where OS represents Off Scale (>5000 g Force on the 4 mm diameter probe at 8.6 mm)

TABLE 1(b)

| Sample # | 12 | 13 | 14 | 15 | 16 | 17 |
|---|---|---|---|---|---|---|
| | Volume (mL) | | | | | |
| TRIXENE ® BI 7770 | 5 | 5 | 5 | 5 | 5 | 5 |
| Jeff T3000 | 5 | 5 | 0 | 0 | 0 | 0 |
| Jeff T5000 | 0 | 0 | 7.5 | 7.5 | 7.5 | 7.5 |
| Base oil | 7.5 | 10 | 2.5 | 5 | 7.5 | 10 |
| Gel time/min | 30-60 | 30-60 | 50 | 50 | 50 | 50 |
| | Hardness at 16 hours (g Force) | | | | | |
| Initial | 4465 | 3380 | OS | OS | 4212 | 2470 |
| Bulk Low | NF | NF | — | — | NF | NF |
| Bulk High | — | — | — | — | — | — |
| Distance to max (mm) | — | — | 25.9 | 29.3 | — | — | where OS represents Off Sscale.

Example 2

Baxenden TRIXENE® BI 7770, a blocked isocyanate and either Huntsman JEFFAMINE® SD-401 or Huntsman JEFFAMINE® SD-2001, secondary amines, a HYPERMER® A70 surfactant, and VG-SUPREME, an organophilic clay available from M-I LLC (Houston, Tex.) were mixed in various proportions. The initial hardness of the resultant gels was measured after 64 hours at 170° F., a temperature lower than typical for curing of a blocked isocyanate with an active hydrogen compound. The hardness of the resultant gels was then measured after the samples had cooled. The formulations and hardness results are shown below in Tables 1(a) and 1(b).

| | Sample # | | | | | |
|---|---|---|---|---|---|---|
| | 1 | 2 | 3 | 4 | 5 | 6 |
| | Volume (mL) | | | | | |
| TRIXENE ® BI 7770 | 5 | 5 | 5 | 5 | 5 | 5 |
| Jeff SD401 | 0.2 | 0.4 | 0.8 | 0 | 0 | 0 |
| Jeff SD2001 | 0 | 0 | 0 | 0.8 | 1.6 | 2.5 |
| Hyp A70 | 1 | 1 | 1 | 1 | 1 | 1 |
| Base oil | 10 | 10 | 10 | 10 | 10 | 10 |
| VG-SUPREME ™ | 0.5 | 0.5 | 0.5 | 0.5 | 0.5 | 0.5 |
| Observations on gel time at 170° F. | liq @ 70 m | liq @ 70 m | starting to gel at 70 m | liq @ 70 m | liq @ 70 m | liq @ 70 m |
| Initial Hardness (g) | 1450 | 1351 | 141 | 384 | 464 | 67.2 |
| Comments | clay in top liquid layer | clay in top liquid layer | clay in top liquid layer | More Homogenous | More Homogenous | More Homogenous |

Applications

Embodiments of the gels disclosed herein may be used in applications including: as an additive in drilling muds; as an additive for enhancing oil recovery (EOR); as one additive in loss circulation material (LCM) pills; wellbore (WB) strengthening treatments; soil stabilization; as a dust suppressant; as a water retainer or a soil conditioner; as hydrotreating (HT) fluid loss additives, and others.

Use in Drilling Muds

Drilling fluids or muds typically include a base fluid (for example water, diesel or mineral oil, or a synthetic compound), weighting agents (for example, barium sulfate or barite may be used), bentonite clay, and various additives that serve specific functions, such as polymers, corrosion inhibitors, emulsifiers, and lubricants. Those having ordinary skill in the art will recognize that a number of different muds exist, and limitations on the present invention is not intended by reference to particular types. During drilling, the mud is injected through the center of the drill string to the drill bit and exits in the annulus between the drill string and the wellbore, fulfilling, in this manner, the cooling and lubrication of the bit, casing of the well, and transporting the drill cuttings to the surface.

The gels disclosed herein may be used as an additive in drilling mud. In some embodiments, the gels may form a filter cake or one component of a filter cake that forms along the wellbore as drilling progresses. The gels contained in the drilling fluid may be deposited along the wellbore throughout the drilling process, potentially strengthening the wellbore by stabilizing shale formations and other sections encountered while drilling. Improved wellbore stability may reduce the occurrence of stuck pipe, hole collapse, hole enlargement, lost circulation, and may improve well control.

Wellbore stability may also be enhanced by the injection of a low viscosity mixture of elastomer precursors into formations along the wellbore. The mixture may then continue to react, strengthening the formation along the wellbore upon gellation of the mixture.

In other embodiments, the gels disclosed herein may aid in lifting solid debris from tubing walls and through the tubing annulus. Hard gels circulating through the drill pipe during drilling may scrape and clean the drill pipe, removing any pipe scale, mud, clay, or other agglomerations that may have adhered to the drill pipe or drill tubing. In this manner, the drill pipe may be maintained free of obstructions that could otherwise hinder removal of drilled solids from the drill pipe during drilling.

Advantages of the present disclosure may include a elastomeric gel with excellent ability to vary the gel properties based on a variety of applications. Such elastomers display an exceptionally wide range of chemistries and physical properties. As such, the elastomer precursors and resulting elastomer may be selected to tailor the properties of the resultant elastomeric gel. Adjustable gellation times, temperatures, and physical properties of the resulting gel may be selected for a particular desired application, and in particular embodiments, gels may form at lower temperatures than typically observed for blocked isocyanates. For example, the elastomeric gel may be chosen to an appropriate hardness, or flexural or elastic moduli. Additionally, elastomer-based systems tend to be flexible, impact resistant, exhibit exceptional bond strength and low toxicity and volatility. Further, by using blocking isocyanates, a delayed gellation may occur so as to allow for sufficient time for the reactants to permeate into the formation prior gellation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of treating an earth formation comprising:
   introducing at least one blocked isocyanate, prepared by subjecting an isocyanate to a reversible blocking reaction with an acidic hydrogen-containing compound, in a liquid phase into the earthen formation;
   introducing at least one amine into the earthen formation;
   unblocking the isocyanate, wherein the isocyanate unblocks at a temperature in the range of 65° C. to 100° C.; and
   contacting the isocyanate and the amine to form an elastomeric gel.

2. The method of claim 1, wherein the amine comprises at least one polyetheramine.

3. The method of claim 1, further comprising: introducing at least one epoxide into the earthen formation.

4. The method of claim 1, wherein the blocked isocyanate comprises at least one isocyanurate ring contained therein.

5. The method of claim 1, wherein the amine is a primary amine.

6. A method of treating an earth formation, comprising:
   introducing at least one blocked isocyanate, prepared by subjecting an isocyanate to a reversible blocking reaction with an acidic hydrogen-containing compound, in a liquid phase into the earth formation;
   introducing at least one amine into the earth formation;
   introducing at least one trimerization catalyst into the earth formation;
   unblocking the isocyanate, wherein the isocyanate unblocks at a temperature in the range of 65° C. to 100° C.;
   contacting the isocyanate, the amine, and the trimerization catalyst to form an elastomeric gel.

7. The method of claim 6, wherein the isocyanate reacts with the amine to form urea bonds.

8. The method of claim 6, wherein the isocyanate in the presence of the trimerization catalyst reacts with itself to form an isocyanurate ring.

9. The method of claim 6, further comprising: introducing at least one organometallic catalyst into the earthen formation.

10. The method of claim 6, wherein the blocked isocyanate, the amine, and the trimerization catalyst are injected simultaneously.

11. The method of claim 6, wherein the blocked isocyanate, the amine, and the trimerization catalyst are injected sequentially.

* * * * *